(12) United States Patent
Richardson et al.

(10) Patent No.: US 9,098,471 B2
(45) Date of Patent: Aug. 4, 2015

(54) DOCUMENT CONTENT RECONSTRUCTION

(75) Inventors: Joshua Richardson, Cupertino, CA (US); Vincent Le Chevalier, San Jose, CA (US); Ashit Joshi, San Jose, CA (US); Dax Eckenberg, Los Gatos, CA (US); Rahul Ravindra Mutalik Desai, San Jose, CA (US); Brent S. Tworetzky, Palo Alto, CA (US); Charles F. Geiger, San Jose, CA (US)

(73) Assignee: Chegg, Inc., Santa Clara, CA (US)

( * ) Notice: Subject to any disclaimer, the term of this patent is extended or adjusted under 35 U.S.C. 154(b) by 483 days.

(21) Appl. No.: 13/543,445

(22) Filed: Jul. 6, 2012

(65) Prior Publication Data

US 2013/0174017 A1 Jul. 4, 2013

Related U.S. Application Data

(60) Provisional application No. 61/581,547, filed on Dec. 29, 2011.

(51) Int. Cl.
*G06F 17/00* (2006.01)
*G06F 17/21* (2006.01)

(52) U.S. Cl.
CPC ...................................... *G06F 17/21* (2013.01)

(58) Field of Classification Search
CPC ............ G06F 17/30076; G06F 17/211; G06F 17/2217; G06F 17/212; G06F 17/217; G06F 17/21; G06F 3/1247; G06F 3/1245; G06F 2207/025; G06F 2207/02; G06F 9/30036; G06F 12/00; G06F 12/02; G06F 9/3016; G06F 7/764; G06K 15/181; G06K 9/00469; H04N 2201/0081; G11C 16/10; G11C 2029/1804; G11C 7/1006; G11C 7/1069; G11C 7/1009; G11C 11/4087; G11C 8/06; H04L 2209/04; H03K 19/17728
See application file for complete search history.

(56) References Cited

U.S. PATENT DOCUMENTS

| 2006/0288281 | A1* | 12/2006 | Merz et al. | 715/531 |
| 2010/0174985 | A1* | 7/2010 | Levy et al. | 715/244 |
| 2012/0042236 | A1* | 2/2012 | Adler et al. | 715/234 |
| 2014/0250361 | A1* | 9/2014 | Wineman et al. | 715/234 |

OTHER PUBLICATIONS

OpenOfficer, "How to Create and Maintain a Table of Contents", Jan. 2004, First Edition, http://www.openoffice.org/documentation/HOW_TO/word_processing/HowTo_Create_and_Maintain_a_TOC.pdf.*
Thomas Phinney, "Eliminate Private Use Encoding in Revised Fonts?", 2006, http://blog.typekit.com/2006/05/12/eliminate_priva/.*

* cited by examiner

*Primary Examiner* — Kavita Padmanabhan
*Assistant Examiner* — Warren Campbell, Jr.
(74) *Attorney, Agent, or Firm* — Fenwick & West LLP

(57) ABSTRACT

A method, a storage medium and a system for document content reconstruction are provided in a digital content delivery and online education services platform to enable delivery of textbooks and other copyrighted material to multi-platform web browser applications. The method comprises ingesting a document page in an unstructured document format. The method further comprises extracting one or more images and metadata associated with the images and text and fonts associated with the texts from the document page. In addition, the method comprises coalescing text into paragraphs and creating a structured document page in a markup language format using the extracted images, text and fonts rendered with layout fidelity to the original ingested document page.

18 Claims, 7 Drawing Sheets

DOCUMENT CONTENT RECONSTRUCTION

CROSS-REFERENCE TO RELATED APPLICATION

This application claims the benefit under 35 U.S.C §119(e) of Provisional Application No. 61/581,547, filed 29 Dec. 2011, which is incorporated by reference in its entirety.

This application is related to U.S. patent application Ser. No. 13/253,011, which is incorporated by reference in its entirety.

BACKGROUND

1. Field of the Invention

This invention relates to a publishing platform for aggregating, managing, and delivering electronic content to connected consumer electronic devices.

2. Description of the Related Art

The education publishing industry faces a number of significant challenges to effectively delivering media and services through an on-line delivery network. These challenges center around four discrete phases:

1. Ingestion: A lack of digital textbook standardization, a plethora of incompatible formats, and a lack of integration and interoperability between publishers makes it difficult to ingest and aggregate a large volume of educational content efficiently and reliably.
2. Publishing: Significant transformation of education content needs to be undertaken to ensure that the content is suited to publish across a variety of client devices that users may use to access the content.
3. Distribution: In an electronic distribution environment, particular attention needs to be given to issues of content protection and rights management, as well as service policies and quality of service, so that content providers are fairly compensated and users of the content perceive the value and reliability of the service.
4. Connected Services: In an educational platform, there exists the potential to deliver a rich user experience that extends beyond electronic access to textbooks. To implement such connected services would require complex business rules and content models that are unavailable in existing education digital publishing services.

Effectively enabling and managing each of the above four phases has not yet been accomplished by the education publishing industry. Accordingly, this has inhibited the growth of delivering media and services through an on-line delivery network.

SUMMARY

Embodiments of the present invention provide a method, a storage medium and a system for document content reconstruction in a digital content delivery and online education services platform, which manages the content delivery of textbooks and other copyrighted material to multi-platform web browser applications. The method comprises ingesting a document page in an unstructured document format. The method further comprises extracting one or more images and metadata associated with the images and text and fonts associated with the texts from the document page. In addition, the method comprises coalescing text into paragraphs and creating a structured document page in a markup language format using the extracted images, text and fonts rendered with layout fidelity to the original ingested document page.

In various embodiments, the extracting of the images comprises identifying graphical operations within the page, determining one or more bounding boxes for the identified graphical operations and intersections of the bounding boxes, combining intersecting bounding boxes, and extracting images within each of the combined bounding boxes. The extracting of the texts within the document page comprises determining Unicode mappings of the texts in the document page, extracting all text characters and glyphs from the document page, identifying horizontal and vertical positions of the extracted text characters and glyphs, and extracting fonts associated with every character extracted. Furthermore, the coalescing of text into paragraphs comprises assembling the extracted text characters into individual words, assembling words into lines, and lines into paragraphs, and assembling paragraphs into respective bounding boxes or regions.

One skilled in the art will readily recognize from the following discussion that alternative embodiments of the structures and methods illustrated herein may be employed without departing from the principles of the invention described herein.

DETAILED DESCRIPTION OF THE EMBODIMENTS

Consumers of a wide distribution of gender and age around world are ready to migrate from print to digital content, as a result of the successful and rapid growing adoption of electronic books and web based publishing services. Book publishers and content providers have embraced this trend by actively converting their large library of content into digital format and making their ever growing content library available to a wide spectrum of user devices across multiple platforms.

The current eBook commercial success is due in part to the adoption of ePUB, the open eBook standard from the International Digital Publishing Platform (IDPF). The ePUB format, with its embedded metadata and single file packaging, has proven to be a good solution for easy distribution and off-line reading. However, complex publications, such as textbooks, which assemble images, graphics, tables, custom fonts, and multicolumn of text, can be quite challenging for the ePUB format to handle. Furthermore, as books become available in the digital domain, the content of books changes dynamically well beyond publishing dates. The wide availability of internet references and the rise of social networks have extended the original static and monolithic reading experience into new dimensions.

Embodiments of the present invention provide a system and method for document content reconstruction in a digital content delivery and online education services platform, which manages the content delivery of textbooks and other copyrighted material to multi-platform web browser applications. In contrast to the ePUB books, which need to be downloaded entirely to ePUB compatible eReaders, the content in modern markup language format can be downloaded to general eReading applications (e.g., a HTML5 compatible browser) on a page by page basis, lowering the risk of book piracy. The document content reconstruction system plays an important role in digitizing the existing ebooks and documents for HTML5 compatible browsers with dynamic content rendering.

Platform Overview

Figure 1:
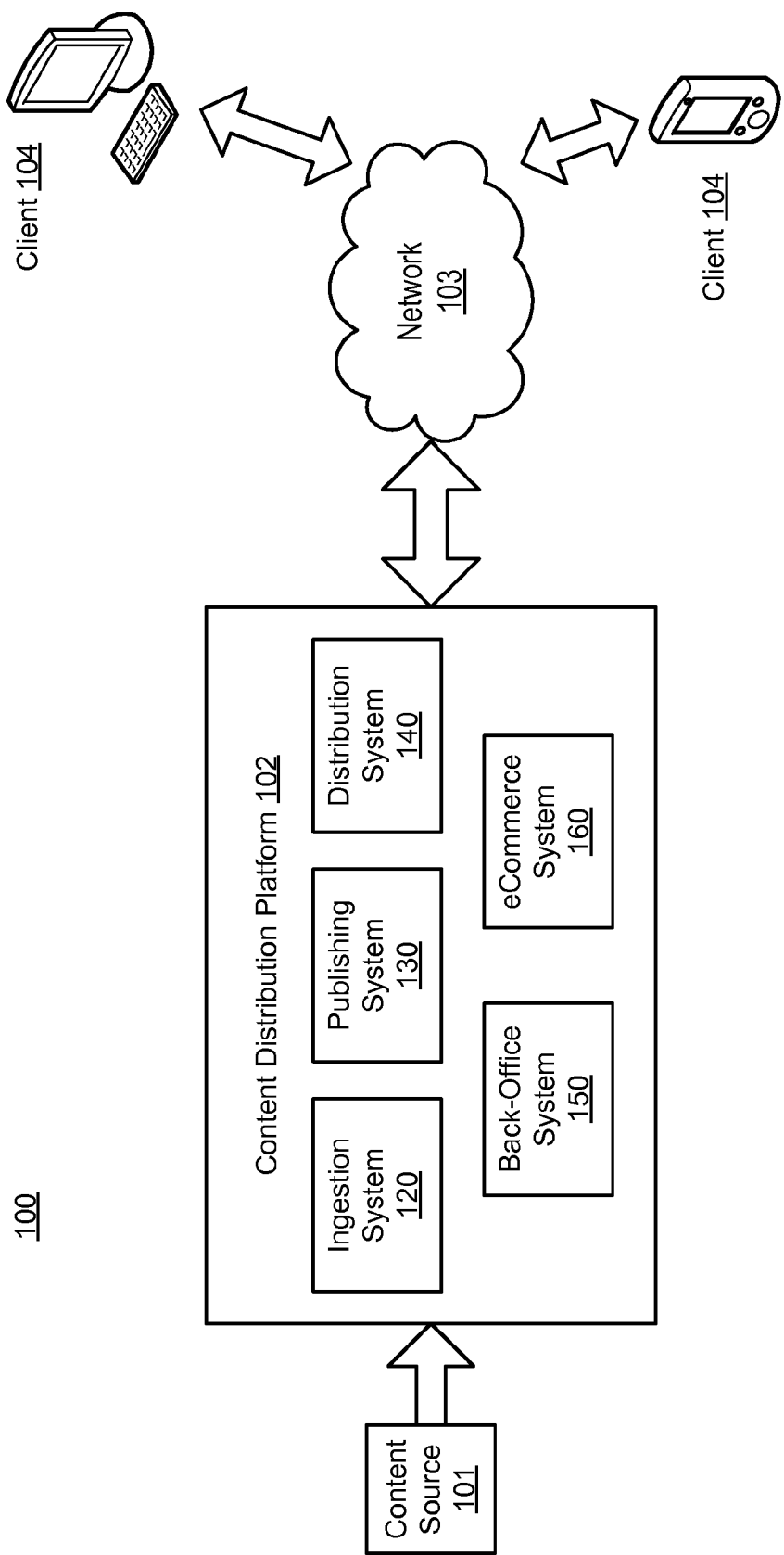
FIG. 1 is a high-level block diagram illustrating a system environment for a digital content delivery and online education platform according to one embodiment.

FIG. 1 is a high-level block diagram illustrating a system environment 100 for a digital content delivery and online education platform. The system environment facilitates flexible distributions of digital books from publishers to end users. The Content Distribution platform 102 is described in more detail in patent application U.S. Ser. No. 13/253,011 titled "Electronic Content Management and Delivery Platform" filed on 4 Oct. 2011, the disclosure of which is incorporated herein by reference in its entirety.

As shown in FIG. 1, the digital reading environment comprises a content source 101, a content distribution platform 102, a network 103, and one or more clients 104. The content source 101 includes digital and printed content automatically gathered and aggregated from a large number of publishers, categories, and partners. Examples of content include textbooks, trade books, magazines, newspapers, user-generated content, web content, and advertising content.

The content distribution platform 102 aggregates, validates, transforms, packages, and monetizes the content collected by the content source 101 into a number of business services, prior to distribution to the clients 104 over the network 103. The platform comprises five systems: an ingestion system 120, a publishing system 130, a distribution system 140, a back-office system 150, and an eCommerce system 160.

The ingestion system 120 first gathers information on the type, file formats, and file manifest of the content. The ingestion system then checks files' integrity and conformity to standards, such as PDF, ePUB2, ePUB3, XML, HTML, and other formats. Content files that fail the integrity and conformity checks are flagged for further testing and repairing. Each content file that passes the checks is assigned a unique identifier and stored in a database for access by the publishing system 130.

The publishing system 130 converts ingested documents into markup language documents, for example, an HTML5 web page with enhanced metadata, which is well-suited to distribution across a wide variety of computing devices connected to the content distribution platform 102 via the network 103. Due to the original format of the source content and the complexity of the layout of the original document, the converted markup language documents are tested by the publishing system 130 to determine whether the conversion preserves the page fidelity compared to the original printed document. The page fidelity includes the original page structure, such as the pagination of the original printed document, the number of columns and arrangement of paragraphs, the placement and appearance of graphics, titles and captions, and the fonts used. Only converted documents that meet a minimum requirement of page fidelity are approved for distribution.

The distribution system 140 packages the content for delivery and uploads the content to content distribution networks. Then, the distribution system 140 makes the content available to end-users based on the content's digital rights management policies. More details of the publishing system 140 are described with reference to FIG. 2 below.

The back-office system 150 handles tasks dedicated to running business within the content distribution platform, such as accounting, human resource, and project management. The back-office system 150 also manages the interactions with customers, clients, and sales.

The eCommerce system 160 manages the online processes of marketing, selling, servicing and receiving payments for digital products and services. Hence the eCommerce system 160 is closely interfaced to the publishing system 130, distribution system 140, as well as the back-office system 150.

The network 103 facilitates content and service distribution and communications between various components of the system environment. Contents are packaged and distributed across the network 103 for client consumption. The overall quality of service received by the clients is also monitored and reported back to the content distribution platform 102 over the network 103. The network 103 is typically a content delivery network (CDN) built on the Internet, but may include any network, including but not limited to a LAN, a MAN, a WAN, a mobile wired or wireless network, a private network, or a virtual private network.

The clients 104 access the content from web browsers on computing devices connected to the network 103. The computing devices include a personal computer, such as a desktop, laptop, or tablet computer, a personal digital assistant, a mobile or smart phone, or a television "set-top box" using a client web application. The educational content are transformed by the content distribution platform 102 and delivered to the clients 104 across the network 103. As the clients enjoy the consistent reading experiences and high-quality services, the web browsers on the clients' devices regularly communicate with the content distribution platform 102 for updating reading content and connected services. In addition, user data on the clients' experience with the service and quality of the network connections are also collected and uploaded to the content distribution platform 102 through network 103.

In contrast to existing digital publishing services, the disclosed content distribution platform does not require users to purchase a specific client device or download a standalone application from the service provider to access the content. Rather, any HTML5 compatible browser on a user's computing device may receive, from the content distribution platform 102, HTML5 page elements to construct pages of a document on the browser, along with a host of document specific metadata to enhance the user's reading experience with the document, such as thumbnail navigation and an interactive table of contents. The HTML5 pages of the document also supports a number of reading activities, such as creating highlights, taking notes, and accessing a dictionary. Annotations, such as highlights, drawings, notes, comments, and other personalized data created by the user can be displayed as an overlay on the original content, stored and archived in the user account, synchronized across all registered devices of the user, and optionally shared among the user's friends, classmates, campus, or other groups, as part of an education social platform.

Document Reconstruction System

Figure 2:
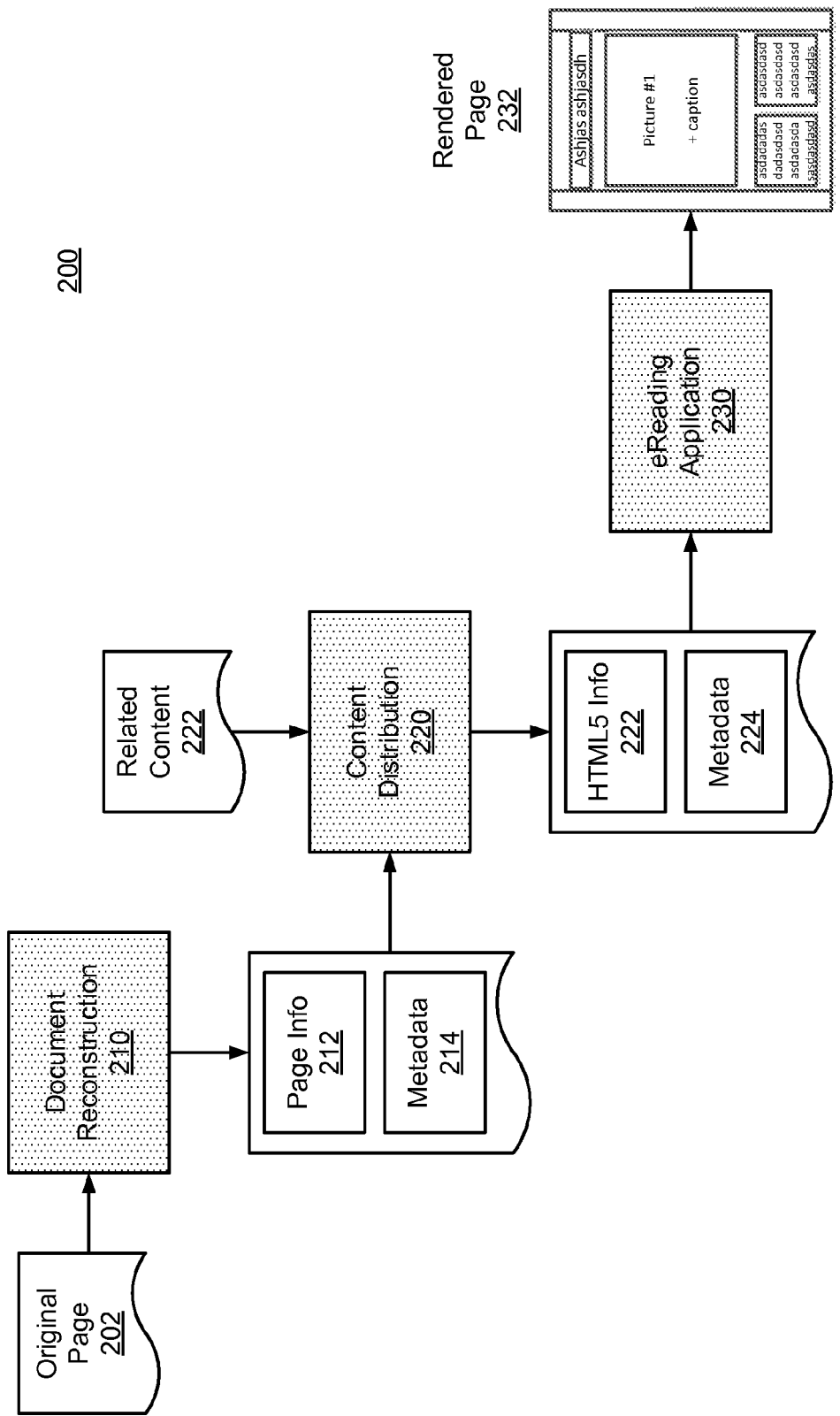
FIG. 2 is a block diagram illustrating an example of the digital publishing platform that integrates a document reconstruction system, according to one embodiment.

FIG. 2 is a block diagram illustrating an example of a digital publishing platform 200 that integrates a document reconstruction system 210 with a content distribution system 220 and an eReading application 230. Aspects of the digital publishing platform 200 may function similarly to the systems 120, 130, and 140 described with reference to the content distribution platform 102 of FIG. 1.

In this example, the document reconstruction system 210 automatically reconstructs an input original page of a document 202 into a series of specific page information 212 and metadata 214. Together with the user-generated and related content 222, the resulting reconstructed elements are reassembled by the content distribution system 220 into HTML5 information 222 and metadata 224, which can be downloaded to the eReading application 230 for rendering. A rendered page 232 that resembles the original page 202 is shown in the browser window.

The goal of the document content reconstruction system 210 is to automatically identify, extract, and index all the key elements and composition of an original document in order to reconstruct it into a modern, flexible and interactive HMTL5 format. The document reconstruction system 210 converts ingested documents into markup language documents well-suited for distribution across various computing devices. It reconstructs the original documents to include dynamic add-ons, such as user generated and related content, while maintaining page fidelity to the original document. The transformed content preserves the original page structure including pagination, number of columns and arrangement of paragraphs, placement and appearance of graphics, titles and captions, and fonts used, regardless of the original format of the source content and complexity of the layout of the original document.

Figure 3:
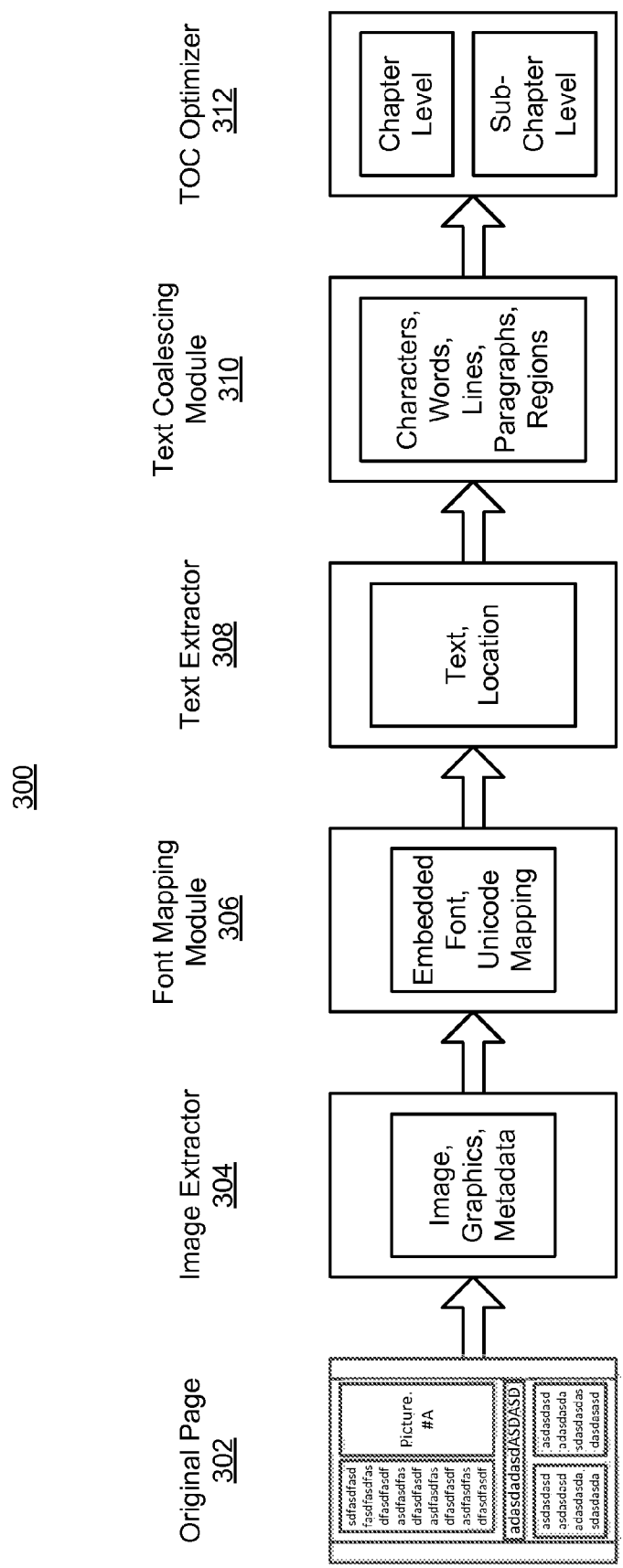
FIG. 3 is a block diagram illustrating the data flow during the document reconstruction process according to one embodiment.
Figure 4:
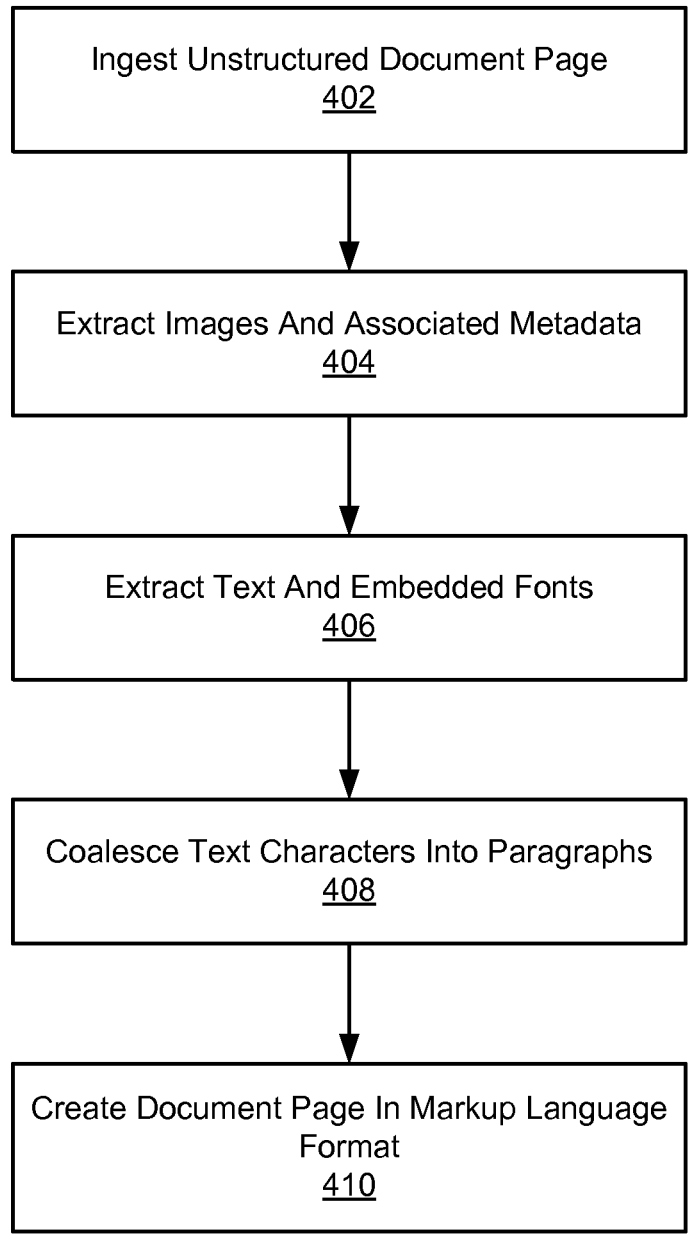
FIG. 4 is a flowchart illustrating a method for reconstructing an unstructured document page according to one embodiment.

FIG. 3 is a block diagram illustrating the data flow 300 during the document reconstruction process according to one embodiment, and FIG. 4 is a flowchart illustrating a method for reconstructing an unstructured document page according to one embodiment. The data flow and method for the reconstruction process will be described below with reference to FIGS. 3-4.

In step 402, an original document page 302 is ingested for processing by a series of system modules configured to perform the automated document reconstruction process. The system modules include an image extractor 304, a font mapping module 306, a text extractor 308, a text coalesce module 310, and a table of content (TOC) optimizer 312. The document reconstruction system 210 admits a variety of ingested document formats, such as PDF, ePUB2, ePUB3, XML, and HTML, among other formats. Documents in ePUB2, ePUB3, XML, and HTML format are all based on structured markup languages, therefore can be readily converted to HTML5 format for the eReading browser applications. However, converting unstructured document formats, such as PDF (portable document format) and SVG (scalable vector graphics), to markup language format, is not straightforward. Embodiments of the invention are described herein with reference to PDF as an input format to the document reconstruction system. PDF is a portable file format for representing documents independent of the application and system used to create, display and print them. A PDF document page may contain any combination of text, graphics, and images with a description of a fixed flat layout. The PDF utilizes a subset of the PostScript page description programming language for generating the layout and graphics. It also includes a font-embedding or replacement system to allow fonts to travel with the documents. The reconstruction of a PDF document involves extracting images and texts from each page of the document and transforming the extracted content into markup language elements, so that each page of the PDF document can be rendered by an eReading browser application. Note that ingested document format is not limited to PDF, other unstructured document format, such as SVG, can also be converted to markup language format in a similar process.

In step 404, images and associated metadata are extracted, for example by the image extractor 304. The operation of the image extractor 304 is described in greater detail below with reference to FIG. 5.

In step 406, text and embedding fonts are extracted. For example, the font mapping module 306 identifies the type of embedded font and Unicode mapping of the text in the original page 302. Then, the text extractor 308 extracts the text and location information from the page. One example of a technique for extracting text from an unstructured document is described in greater detail below with reference to FIG. 6.

In step 408, the text characters are coalesced into paragraphs, for example by the text coalescing module 310. The text coalescing module 310 assembles the extracted text characters into words, words into lines, lines into paragraphs, and eventually into bounding boxes and regions. An example method for text coalescing according to one embodiment of the invention is described in greater detail below with reference to FIG. 7.

In step 410, after the extraction of the page elements including images, text, and metadata, the document page can be created in markup language format with page fidelity. Once all the pages in the original document have been reconstructed, the TOC optimizer 312 parses the chapter and sub-chapter captions in the document as well as any dynamic related content to generate a TOC. The outcome of this reconstruction process is a comprehensive set of document specific components including graphics, text, fonts, metadata, page layout information, as well as user-generated and related content, which are aggregated and distributed to HTML5 compatible browsers for dynamic content rendering.

Image Extraction

A PDF page consists of one or more content streams, which include a sequence of objects, such as path objects, text objects, and external objects. A path object describes vector graphics made up of lines, rectangles, and curves. Path can be stroked or filled with colors and patterns as specified by the operators at the end of the path object. A text object comprises character stings identifying sequences of glyphs to be drawn on the page. The text object also specifies the encodings and fonts for the character strings. An external object XObject defines an outside resource, such as a raster image in JPEG format. An XObject of an image contains image properties and an associated stream of the image data.

Figure 5:
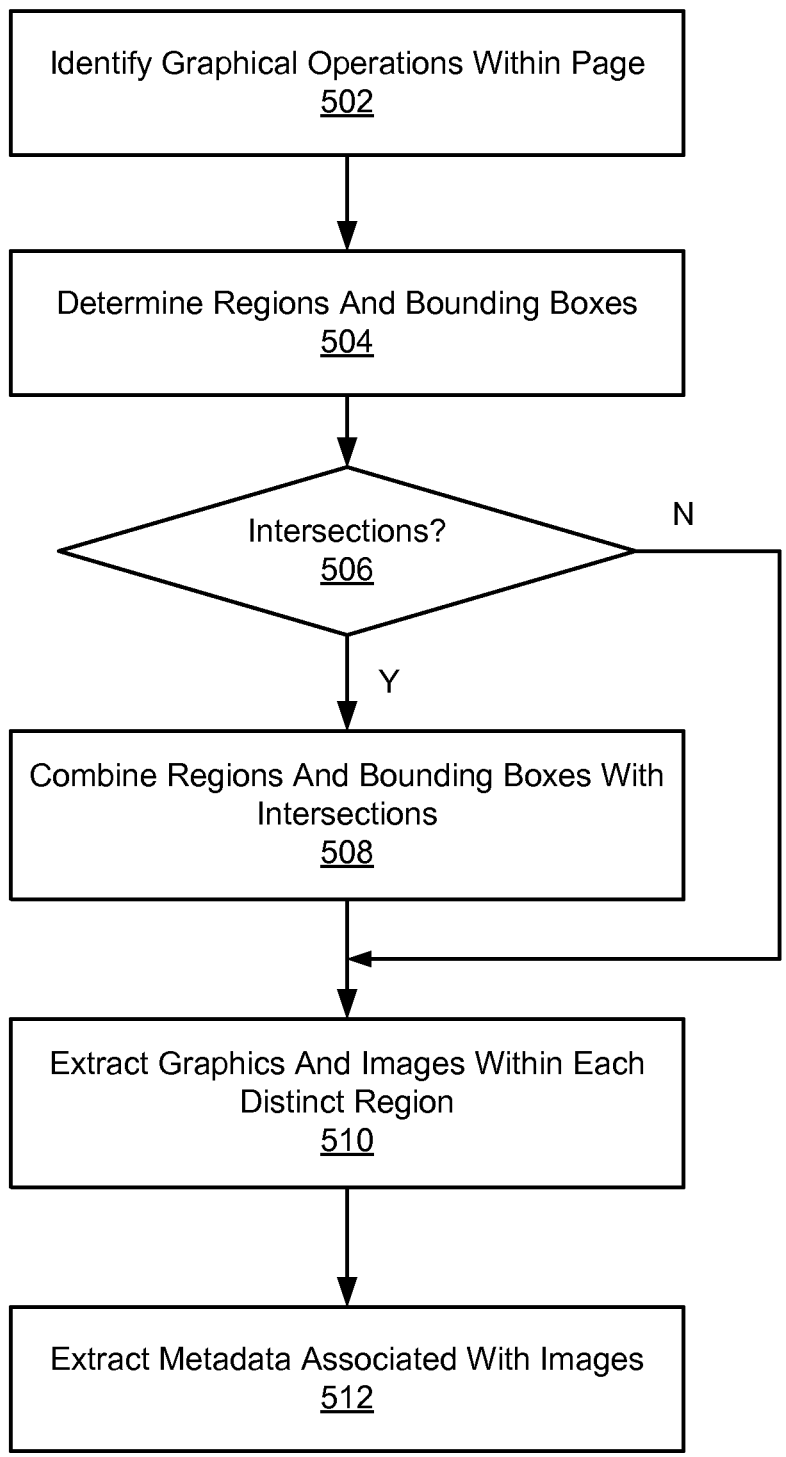
FIG. 5 is a flowchart illustrating a method for extracting images from an unstructured document according to one embodiment.

FIG. 5 is a flowchart illustrating a method for extracting images from an unstructured document according to one embodiment. This process identifies graphical operations within a page and determines their respective regions and bounding boxes before extracting images. The first step of image extraction is to identify 502 graphical operations within the page. For example, a path object in a PDF page may include multiple path construction operators that describe vector graphics made up of lines, rectangles, and curves.

Next, the regions of the path constructions and the bounding boxes of the images are determined 504. For example, the image object XObject includes parameters such as width and height of the source image. In case that more than one region or bounding box are present, the process analyzes and compares the regions and bounding boxes to determine 506 if they intersect with each other. If so, the process combines 508 the intersecting regions and bounding boxes into one region. Once all bounding boxes and regions are properly identified in the page and there are no more intersections between them, the process extracts 510 graphics and images within each distinct region based on their graphical rendering.

Next, the process continues to extract 512 metadata associated with each of the images in the document page. The metadata associated with images includes: resolutions, positions, and captions of the images. Resolution of an image is often measured by horizontal and vertical pixel counts in the image, higher resolution means more image details. The image extraction process may extract the image in the original resolution as well as other resolutions targeting different eReading devices and applications. For example, a large XVGA image can be extracted and down sampled to QVGA size for a device with QVGA display. The image extraction process also notes the position information of each image. The position information of the images is critical to page fidelity when rendering the document pages in eReading browser applications, especially for complex documents containing multiple images per page. Another metadata that needs to be extracted is the caption associated with each image that define the content of the image. The extraction process search for possible caption based on key words, such as "Picture", "Image", and "Tables", from texts around the image in the original page. The extracted image metadata for the page may be stored to the overall document metadata and indexed by the page number.

The image extraction process also extracts tables, which comprises graphics (horizontal and vertical lines) and text rows and columns. The lines forming the tables can be extracted and stored separately from the rows and columns of the text. The image extraction process is repeated for all the pages in the unstructured document until all images in each page are identified and extracted. At the end of the process, an image map that includes all graphics, images, tables and other graphic elements of the document is generated for the eReading platform.

Text Extraction

Internally, text in a PDF page's content stream is included in text sections, which also contain operators specifying font type, size, position, and spacing, among other parameters. A font, such as Times Roman and Courier fonts, contains a repertoire of glyphs, which are often identified by their numbers corresponding to code positions of the characters presented by the glyphs. In this sense, a font is character-code dependent. A font may contain the same glyph for distinct characters, or alternative glyphs for a character for use in different contexts.

The font encoding describes the mapping between numeric character codes and glyph descriptions in the font, such as Unicode. Unicode introduces a character code system that gives every character of every language a universal unique number independent of the font, software, and system. The definition of a character in Unicode is given in code charts, which include a Unicode number, representative glyph, Unicode name (in uppercase) among other information. For example, a lower case letter 'e' in the Unicode chart contains the following data: a Unicode number U+0065, a glyph of looks much like 'e' and a Unicode name of "LATIN SMALL LETTER E" and various encodings.

Although occasionally an unstructured document may use system font not embedded, most complex documents, such as textbooks, have fonts embedded in PDF files when published. To ensure page fidelity, the document reconstruction system extracts the fonts and encodings used in the original unstructured documents so that eReading browser applications can reconstruct pages faithfully. However, these fonts and encodings very often include customized fonts and non-standard encodings, which may present some challenges to the document reconstruction system.

For example, an unstructured document may use standard encodings generally, but redefine the font mapping for one or more glyphs, such as remapping all lower-case letters to upper-case letters. The document may also include customized glyphs, such as a logo or a math symbol, which are placed in random positions in the character code chart with no standard Unicode mapping. Furthermore, the original document can adopt a completely custom font with a self-defined non-standard encoding, in which the character codes make no sense unless associated with the custom font.

The challenges imposed by these non-standard, custom fonts and encodings to the document reconstruction system, however, do not lie in the rendering of the custom encoded fonts. The eReading browser applications can display the extracted text faithfully, as long as the custom fonts and encodings are extracted and preserved from the original documents. The problem is for the eReading browser applications to present the extracted text in a meaningful way not only in display but also in semantics, so that users of the eReading browser applications can perform operations, such as "cut and paste", "search", and "look up in a dictionary", on the text even thought the underlying encoding is non-standard.

As an example, Table 1 illustrates a sample font with a non-standard, custom encoding of a lower case letter 'e' and a bold lower case 'e' in a document. In order to display the two custom-encoded letters, an eReading browser application creates an HTML snippet for displaying the character code "" as the glyph 'e' and """ as the bold 'e' based on the encodings shown in Table 1. If the original document contains a word 'elephant' with two custom coded bold 'e', the word can displayed correctly with string "phant" assuming other characters are standardly encoded. But obviously the string cannot match a search for the word "elephant" in standard encoding and cannot be copied and pasted to other applications that have no knowledge on the custom encoding.

TABLE 1

Sample font with custom encoding

| Character Code | Glyph |
|---|---|
|  | e |
|  | e |

The problem in the above example is caused by the fact that the non-standard encoding adopted by the eReading browser application presents the corresponding glyphs correctly, but fails to capture the semantics of the letters. One possible solution to capture the semantics of the custom fonts is to remap the non-standard encodings to a standard encoding, such as the Unicode. For example, the bold 'e' in Table 1 can be remapped to a closest Unicode entry of U+1D5F2 under name "MATHEMATICAL SANS-SERIF BOLD SMALL E". Even in this case, the semantic meaning of any words comprising an 'e' is not likely the same as those with a regular 'e'. Alternatively, if both letters in Table 1 are remapped to Unicode U+0065 under name "LATIN SMALL LETTER E", the semantics of any words with an 'e' or 'e' are preserved, but the special presentations of the bold 'e' in the original document are lost. It is impossible for the Unicode standard to provide an encoding to every possible custom font that designers might come up with. Besides, there is no universally accepted way in remapping these custom fonts, such as the two versions of the same letter 'e' in Table 1, in Unicode.

In one embodiment, a remapping scheme for custom, non-standard font encoding is provided in order to preserve both the presentation and the semantics of the custom fonts. This remapping scheme utilizes the Private Use Area (PUA) of the Unicode so that multiple instances of the same letter can be mapped into different areas in the PUA. The PUA does not contain any character assignments, hence no character code charts or name lists are stored. The remapping rules are defined as the following: the first instance of a character, which is usually the regular form, is remapped into its normal place in the Unicode charts, a second instance is mapped into PUA with an offset of 0xF0000, and a third instance into PUA with an offset of 0x010000. For example, the two 'e's in Table. 1 are mapped to Unicode U+0065 and U+F0065, respectively, so that both presentations are preserved. In the eReading browser applications, a JAVASCRIPT snippet is created to mask off the offset (i.e., the higher-order bytes) after the custom font has been correctly rendered. For example, the character code U+F0065 of the bold 'e' in Table. 1 is masked to become U+0065, the code for the regular 'e'. The result of the masking ensures that any word comprising either instances of the letter can be selected for copy and pasted, or search with correct semantic meaning and a proper rendering in the same font as in the original documents.

Figure 6:
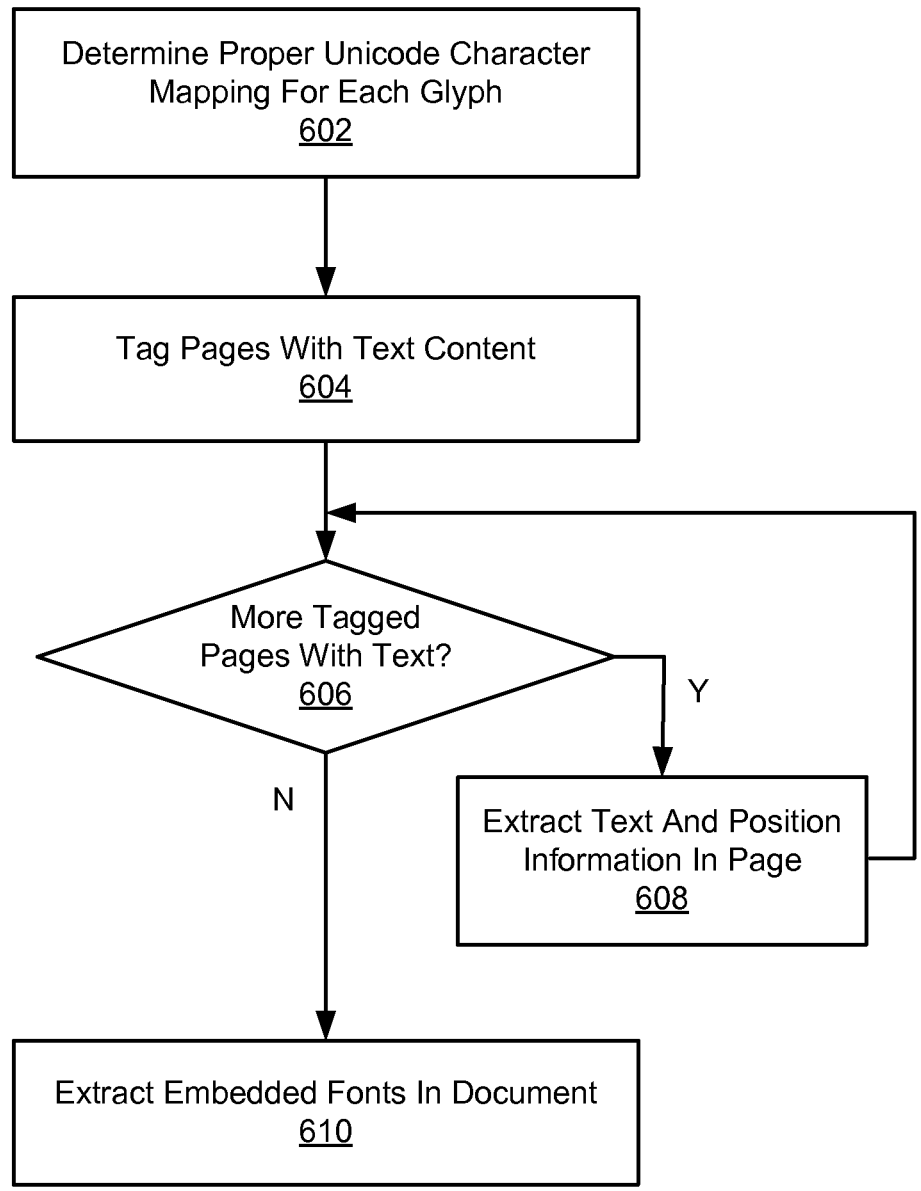
FIG. 6 is a flowchart illustrating a method for extracting text from an unstructured document according to one embodiment.

FIG. 6 is a flowchart illustrating a method for extracting text from an unstructured document according to one embodiment. The text extraction process starts by determining 602 the proper Unicode character mapping for each glyph in a document to be reconstructed. The proper mapping ensures that no two glyphs are mapped to a same Unicode character. To achieve this goal, a set of rules are defined and followed by the text extraction process. The rules include: applying the Unicode mapping found in the embedded font file; determining the Unicode mapping by looking postscript character names in a standard table, such as a system TrueType font dictionary; and determining the Unicode mapping by looking for patterns, such as hex codes, postscript name variants, and ligature notations.

Applying these rules in the correct order helps the text extraction process to determine proper Unicode character mapping accurately. For those glyphs or symbols that still cannot be mapped following the above rules, pattern recognition techniques may be applied on the rendered font to identify Unicode characters. If pattern recognition is still unsuccessful, the text extraction process maps the unrecognized characters into the PUA of Unicode as a last resort. In this case, the semantics of the characters are not identified, but the encoding uniqueness is guaranteed. As such, rendering is always faithful to the original document.

The text extraction process then tags 604 all the pages with text in the document. In one embodiment, the text extraction process identifies all the pages with one or more text objects in the original document. Alternatively, the text extraction process can mark only the pages without any embedded text, so the eReader browser applications can easily identify these pages, allowing users to skip over them when browsing through the rendered text in the original document.

Next, the text extraction process extracts text from all the pages with text in the original document. The process determines 606 whether there are more tagged pages with text in the document. If so, all the individual text characters and glyphs on the next tagged page are extracted 608 together with position information. The text extraction is done at the individual character level, together with markers separating words, lines, and paragraphs. The extracted text characters and glyphs are represented with the proper Unicode character mapping determined in step 602. The position of every character is identified by its horizontal and vertical locations within the page. For instance, if an original page is in A4 standard size, the location of every character in the page can be defined by its X and Y location relative to the A4 page dimensions. The text extraction is performed on a page by page basis until there are no more tagged pages with text.

Finally, the text extraction process extracts 610 embedded fonts in the document in addition to the text content. The extracted fonts are stored and referred later by the eReading browser application to render the text content. The outcome of the text extraction process, therefore, is a dataset referenced by the page number, comprising all the characters and glyphs in a Unicode character mapping with associated location information and embedded fonts used in the original document.

Text Coalescing

Once characters have been extracted from the unstructured document, the document reconstruction system reassembles the individual characters into paragraphs so the text content can be rendered by the eReading browser applications with high page fidelity. In one embodiment, this text coalescing process includes several steps: assembling text into words, assembling words into lines, assembling lines into paragraphs, and assembling paragraphs into bounding boxes, which are executed sequentially in order to reassemble the text elements in a semantically meaningful way and to recompose each document page. These steps leverage the known attributes about extracted text in each page, such as information on the text position within the page, text direction (e.g., left to right, or top to bottom), font type (e.g., Arial, or Courier), font style (e.g., bold and/or italic), expected spacing between characters based on font type and style, and other graphics state parameters of the PDF pages.

Figure 7:
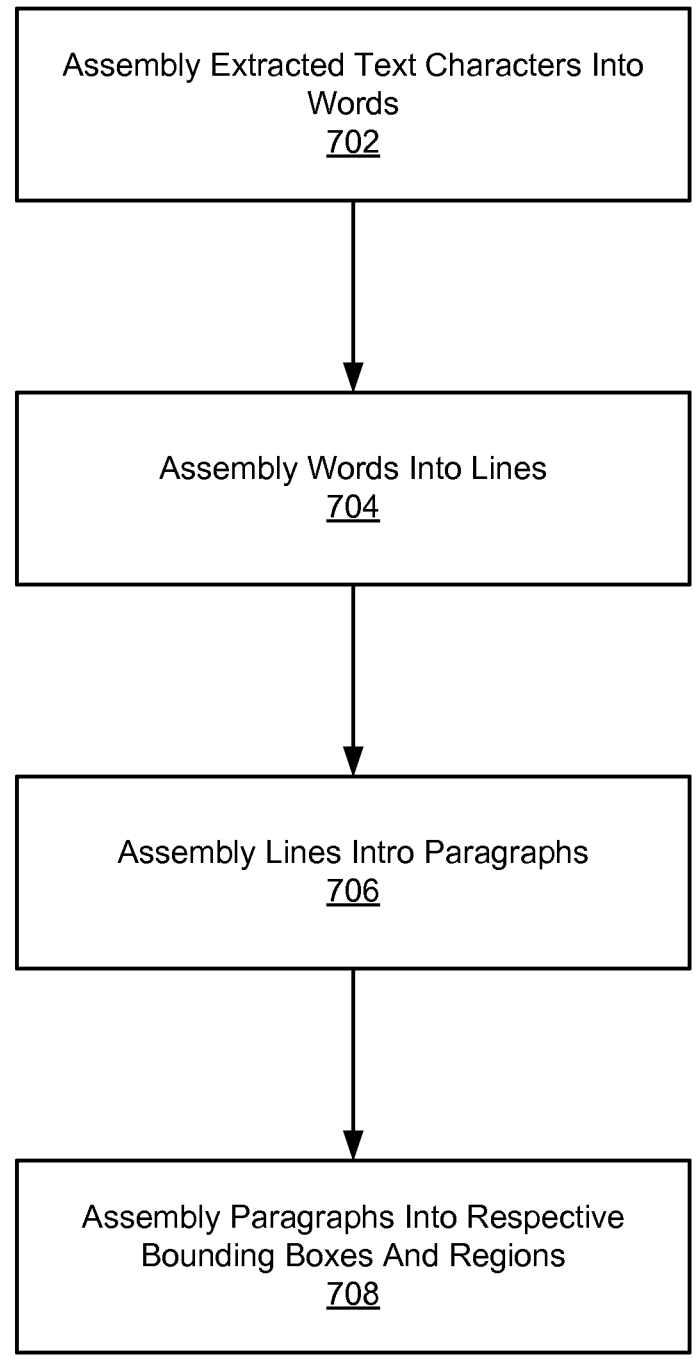
FIG. 7 is a flowchart illustrating a method for text coalescing according to one embodiment.

FIG. 7 is a flowchart illustrating a method for text coalescing according to one embodiment. The process begins with assembling 702 extracted text characters into words based on spacing and semantics. To determine how characters can be aggregated into words, the process analyzes the actual spacing between adjacent characters and compares it to the expected character spacing based on the known text direction, font type, style and size, as well as other graphics state parameters, such as character-spacing and zoom level. Despite different rendering engines adopted by the eReading browser application, the average spacing between adjacent characters within a word is always smaller than the spacing between adjacent words. For example, a string of "Berriesaregood" represents some extracted characters without considering spacing information. Once taking the spacing into consideration, the same string becomes "Berries are good", where the average character spacing within a word is conspicuously smaller than the spacing between words.

Semantic analysis can also be used to assemble characters into words. For example, the string of "Berriesaregood" is input to a semantic analysis tool, which matches the string to dictionary entries or internet search terms, and output the longest match found within the string. The outcome of this process is a semantically meaningful string of "Berries are good". In one embodiment, the semantic analysis and the character assembling based on spacing can both be applied to the same text, so that word grouping results may be verified and enhanced.

Next in the text coalescing process, words are assembled 704 into lines by determining where each line of text effectively ends. Based on the text direction, this process analyzes the horizontal spacing between words and compares it with an average value. If the word spacing is larger than the average, the end of the line is determined. For example, in a two-column page, the end of the line of the first column is determined by having a spacing value much larger than the average word spacing within the column. While in a single column page, the end of the line may be identified when the space after a word extended to the side of the page or bounding box.

The text coalescing process next involves assembling 706 lines into paragraphs. Based on the text direction and the type of bounding box indentation upon which the texts are based, a vertical spacing analyzer computes the actual spacing between consecutive lines and compares them with each other. If a vertical spacing becomes larger than average, the end of a paragraph can be determined. Similarly, the semantic analysis may also be applied to relate syntactic structures on phrases and sentences, so that meaningful paragraphs can be formed. The semantic analysis can be separately applied or combined with the spacing analysis in assembling lines into paragraphs.

Finally, paragraphs are assembled 708 into bounding boxes or regions in the text coalescing process. In this step, paragraphs are analyzed based on lexical rules associated with the corresponding language of the text. A semantic analyzer is executed to look for punctuation (or the lack of it) at the beginning or the end of a paragraph to determine whether the paragraph contains valid beginning or ending. For example, a paragraph usually ends with a period. Not finding one at the end of the paragraph indicates that the paragraph is likely to continue to either next column or next page. To group paragraphs together, the semantic analyzer is configured to analyze the syntactic structures of the paragraphs to determine the text flow from one paragraph to the next. In case that multiple groupings of the paragraphs are possible, external lexical databases, such as the WORDNET®, can be referred to to determine which paragraphs are semantically similar.

TOC Optimization

The table of contents (TOC) comprises content indexes into the most relevant document components, which help users to navigate the document. The content indexes are traditionally aggregated into a document-specific TOC that describe the overall structure or spine of the document at page level. In the eReading publishing platform where printed publications get converted into the digital domain with preservation of page fidelity, it is necessary to keep the digital page numbering consistent with the original document page.

The TOC optimization process aims at optimizing the TOC at different layers. At the primary layer, chapter headings are searched within the document in order to retrieve all chapter indexes including, for example, the preface, chapter numbers, chapter titles, and appendix. This process also associates the actual document page number for each of the TOC elements that have been identified.

In one embodiment, chapter headings can be retrieved by first identifying the spacing between chapters and segmenting the document into chapters according to the identified spacing. At the beginning of each chapter segment, a typical font face, such as the font type, style and size, used for the chapter headings can be determined. A font face that is the least typical is generally preferred. Based on the typical font face, the document can be parsed to retrieve all the occurrences of the font face. If the analysis results in a plausible distribution of chapters, the primary TOC process to find chapter headings is completed.

At the secondary TOC Layers, sub-chapter headings within the document are searched and retrieved. The secondary level indexes include dedications and acknowledgements, sections titles, image captions, and table titles. This step also associates the page numbers with each identified TOC sub-elements. In one embodiment, spacing between sections is first determined and each chapter of the document is segmented by the section spacing. At the beginning of each section segment, a typical font face for the section headings is identified including font size, weight, and style. Generally, a font face that is the least typical is preferred. Based on the typical font face, each chapter is parsed to retrieve all the occurrences of the font face. If the analysis results in a plausible distribution of sections, the secondary TOC process to find sub-chapter headings is completed.

Although the structure and corresponding TOC of a printed document is static, the major benefit provided by the document reconstruction system of the digital content distribution platform is allowing the content and service provider to add dynamic content into the existing publication to enhance and extend user experiences otherwise impossible. For instance, sections, such as additional appendices and alternate quiz questions can be added to the original textbooks, even after the textbooks have been published and distributed. Furthermore, related references and user generated content can be attached on top of the existing publications. These dynamic contents are not included in the original TOC, therefore, need to be indexed and included in the TOC on an on-going basis whenever any new content is added.

To conclude, the document reconstruction system 200 as it automates the transformation of existing unstructured document content (e.g., PDF files) into a series of markup language objects (e.g., HTML5 objects) including specific page information and metadata. By extracting the key elements in each document page including images, text, embedded fonts, position information, regions, metadata, and table of contents, embodiments of the invention produce a page specific set of elements. These elements, together with other related multimedia, interactive and social content, can be used to enhance users' reading experience and facilitate the deployment and monetization of content in modern online education services.

Additional Configuration Considerations

The present invention has been described in particular detail with respect to several possible embodiments. Those of skill in the art will appreciate that the invention may be practiced in other embodiments. The particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer and run by a computer processor. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

In addition, the present invention is not limited to any particular programming language. It is appreciated that a variety of programming languages may be used to implement the teachings of the present invention as described herein, and any references to specific languages, such as HTML5, are provided for enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

What is claimed is:

1. A method comprising:
    ingesting a document page in an unstructured document format, having a specified layout;
    extracting one or more images and metadata associated with the images from the document page;
    extracting text, and fonts associated with the texts, from the document page, wherein extracting the texts comprises:
        determining Unicode mappings of the texts in the document page by:
            mapping a first glyph of a letter to a standard code number in a Unicode chart table, and
            mapping each of the one or more glyphs of the same letter to a unique code number in Private Use Area (PUA) of the Unicode, wherein each code number in PUA is obtained by masking the standard code number of the first glyph with a unique highest byte offset,
    extracting all text characters and glyphs from the document page,
    identifying horizontal and vertical positions of the extracted text characters and glyphs, and
    extracting fonts associated with every character extracted;
    coalescing the text into paragraphs; and
    creating a structured document page in a markup language format using the extracted images, the text and the fonts rendered in accordance with the specified layout of the original ingested document page.

2. The method of claim 1, wherein extracting one or more images comprises:
    identifying graphical operations within the page;
    determining one or more bounding boxes for the identified graphical operations and intersections of the bounding boxes;
    combining intersecting bounding boxes; and
    extracting images within each of the combined bounding boxes.

3. The method of claim 1, wherein the metadata associated with the images includes at least one of: resolution, position, and caption of the images.

4. The method of claim 1, further comprising restoring semantics of the letter by masking off the unique highest byte offset after displaying a corresponding glyph in an eReading browser application.

5. The method of claim 1, wherein coalescing text into paragraphs comprises:
    assembling the extracted text characters into individual words;
    assembling words into lines, and lines into paragraphs; and
    assembling paragraphs into respective bounding boxes or regions.

6. The method of claim 5, wherein coalescing text into paragraphs is based on spacing and semantic analysis.

7. The method of claim 1, further comprising:
    repeating document reconstruction and recreation for each page of a plurality of pages in a document; and
    constructing a table of contents for the document.

8. The method of claim 7, wherein constructing a table of contents comprises:
    searching for chapter headings within the document;
    retrieving chapter level indices;
    searching for sub-chapter headings within the document to retrieve sub-chapter level indices; and
    updating dynamically the table of contents indices when new content is added.

9. A method for extracting texts within a document page comprising:
    extracting text with custom fonts within the document page, the custom fonts having non-standard encodings, the extracting comprising determining Unicode mappings of the non-standard encodings by:
        mapping a first glyph of a letter to a standard code number in a Unicode chart table; and
        mapping one or more glyphs of the same letter to a unique code number in Private Use Area (PUA) of the Unicode, each code number in PUA obtained by masking the standard code number of the first glyph with a unique highest byte offset; and restoring semantics of the letter by masking off the unique highest byte offset after displaying a corresponding glyph in an eReading browser application.

10. A non-transitory computer-readable storage medium storing executable computer program instructions for document content reconstruction, the computer program instructions comprising instructions for:

ingesting a document page in an unstructured document format, having a specified layout;

extracting one or more images and metadata associated with the images from the document page;

extracting text, and fonts associated with the texts, from the document page, wherein extracting the texts comprises:

determining Unicode mappings of the texts in the document page by:

mapping a first glyph of a letter to a standard code number in a Unicode chart table, and mapping each of the one or more glyphs of the same letter to a unique code number in Private Use Area (PUA) of the Unicode, wherein each code number in PUA is obtained by masking the standard code number of the first glyph with a unique highest byte offset, extracting all text characters and glyphs from the document page, identifying horizontal and vertical positions of the extracted text characters and glyphs, and extracting fonts associated with every character extracted;

coalescing the text into paragraphs; and creating a structured document page in a markup language format using the extracted images, the text and the fonts rendered in accordance with the specified layout of the original ingested document page.

11. The storage medium of claim 10, wherein extracting one or more images comprises:

identifying graphical operations within the page;

determining one or more bounding boxes for the identified graphical operations and intersections of the bounding boxes;

combining intersecting bounding boxes; and extracting images within each of the combined bounding boxes.

12. The storage medium of claim 10, wherein the metadata associated with the images includes at least one of: resolution, position, and caption of the images.

13. The storage medium of claim 10, further comprising restoring semantics of the letter by masking off the unique highest byte offset after displaying a corresponding glyph in an eReading browser application.

14. The storage medium of claim 10, wherein coalescing text into paragraphs comprises:

assembling the extracted text characters into individual words;

assembling words into lines, and lines into paragraphs; and assembling paragraphs into respective bounding boxes or regions.

15. The storage medium of claim 14, wherein coalescing text into paragraphs is based on spacing and semantic analysis.

16. The storage medium of claim 10, further comprising:

repeating document reconstruction and recreation for each page of a plurality of pages in a document; and constructing a table of contents for the document.

17. The storage medium of claim 16, wherein constructing a table of contents comprises:

searching for chapter headings within the document;

retrieving chapter level indices;

searching for sub-chapter headings within the document to retrieve sub-chapter level indices; and updating dynamically the table of contents indices when new content is added.

18. A non-transitory computer readable storage medium storing executable computer program instructions for extracting texts within a document page, the computer program instructions comprising instructions for:

extracting text with custom fonts within the document page, the custom fonts having non-standard encodings, the extracting comprising determining Unicode mappings of the non-standard encodings by:

mapping a first glyph of a letter to a standard code number in a Unicode chart table; and mapping one or more glyphs of the same letter to a unique code number in Private Use Area (PUA) of the Unicode, each code number in PUA obtained by masking the standard code number of the first glyph with a unique highest byte offset; and restoring semantics of the letter by masking off the unique highest byte offset after displaying a corresponding glyph in an eReading browser application.

* * * * *